(12) United States Patent
Cook et al.

(10) Patent No.: US 7,127,967 B2
(45) Date of Patent: Oct. 31, 2006

(54) POWER TRANSFER UNIT

(75) Inventors: Dennis Cook, Royal Oak, MI (US);
George Leposky, Belleville, MI (US);
Derrick Black, Waterford, MI (US);
John Jennings, Rochester, MI (US);
Jonathan Adler, Ann Arbor, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 0 days.

(21) Appl. No.: 10/444,032

(22) Filed: May 22, 2003

(65) Prior Publication Data

US 2004/0235605 A1 Nov. 25, 2004

(51) Int. Cl.
*F16H 37/06* (2006.01)

(52) U.S. Cl. ............... 74/665 GC; 74/413; 74/420; 74/665 H

(58) Field of Classification Search ........... 74/413, 74/417, 420, 665 GA, 665 GC, 665 H
See application file for complete search history.

(56) References Cited

U.S. PATENT DOCUMENTS

| | | | |
|---|---|---|---|
| 1,830,810 A * | 11/1931 | Russell ............. | 212/172 |
| 2,392,313 A * | 1/1946 | Dahlstrand ............ | 74/420 |
| 4,223,570 A | 9/1980 | Yamamori et al. | |
| 5,205,373 A * | 4/1993 | Kadokura et al. ......... | 180/248 |
| 5,222,573 A * | 6/1993 | Kameda et al. ............ | 180/297 |
| 5,515,940 A * | 5/1996 | Shichinohe et al. ........ | 180/376 |
| 5,609,072 A * | 3/1997 | Lequis et al. ............ | 74/606 R |
| 6,076,623 A * | 6/2000 | Teraoka et al. ............ | 180/233 |
| 6,605,018 B1 * | 8/2003 | Palazzolo ................ | 475/222 |
| 6,763,736 B1 * | 7/2004 | Hori et al. ................ | 74/329 |
| 2003/0040395 A1 | 2/2003 | Palazzolo | |

FOREIGN PATENT DOCUMENTS

| | | |
|---|---|---|
| DE | 198 11 874 A1 | 11/1998 |
| EP | 0 279 889 | 4/1987 |
| JP | 09-216524 * | 8/1997 |

\* cited by examiner

*Primary Examiner*—Ha Ho

(57) ABSTRACT

A motor vehicle power transfer unit for distributing torque from a transmission assembly between a front wheel drive line and rear wheel drive line. The power transfer unit includes a housing that encloses a parallel gear set and a non-parallel gear set, which are coupled between an input portion and an output portion of the power transfer unit. The parallel gear set includes a driving gear, and idler gear and a driven gear and the idler gear is rotatably supported on a non-rotating support member that extends through the idler gear. Constructed in this manner, reduced lateral compactness of the power transfer unit is achieved.

28 Claims, 3 Drawing Sheets

POWER TRANSFER UNIT

BACKGROUND

1. Field of the Invention

The present invention relates to the power train of a motor vehicle. More specifically, the present invention relates to a power transfer unit for distributing power to the rear wheels of the vehicle.

2. Description of the Prior Art

Most automobiles in the United States have typically utilized a rear wheel drive power delivery scheme. In adapting these rear wheel drive schemes into four wheel drive applications, a transfer case was, and often still is, positioned at the output of the transmission assembly. When engaged, the transfer case diverts a portion of the power coming from the transmission assembly from the rear wheels to the front wheels.

Currently in the United States, a significant portion of new automobiles are front wheel drive based vehicles. In a front wheel drive vehicle, typically both the engine and the transmission assembly are transversely oriented in the vehicle. By positioning the power plant and transmission assembly transversely, more direct coupling of the transmission assembly to the vehicle's transaxle and front wheels can be achieved.

With front wheel drive vehicles themselves becoming a mature market, a recent trend in the automobile industry has been to adapt front wheel drive schemes into all-wheel-drive or four-wheel-drive applications. This is accomplished by providing a power transfer unit that diverts a portion of the power from the front wheels to a rear wheel drive shaft and, subsequently, the rear wheels.

As a way of maximizing manufacturing resources, it is desirable to develop automotive products that can be utilized and incorporated across a variety of platforms. When incorporated into a vehicle, the power transfer unit is attached to the output face of the vehicle transmission. It is therefore in close proximity to the engine, the transmission, the steering rack and the exhaust manifold. Additionally, new PZEV catalytic converters are required to be located closer to the exhaust manifold so that they can achieve a quicker "light-off" of the catalyst. These PZEV catalytic converters also tend to be larger and generate higher temperatures than previous non-PZEV catalytic converters. The proximity to the engine, transmission and the other under hood components accordingly limits the size of the power transfer unit. Further, the high temperature of "manicat" catalytic converters and the previously mentioned PZEV catalytic converters means that polymer based products, such as lubricants and seals, need to be placed at as great a distance as possible from the PZEV catalytic converter.

One manner in which the overall size of the power transfer unit can be reduced is to similarly reduce the size of the gears, bearings and shafts of the power transfer unit itself. However, reducing the size of these components limits their overall torque carrying capacity.

An end result of all of the above is a desire for lateral compactness in the design of the power transfer unit. By compacting this lateral size of the power transfer unit, the power transfer unit can be configured as multiplatform assembly, in that the system itself can be designed for the worst case scenario, in other words the minimum lateral width available for a power transfer unit.

In order to achieve the greatest lateral compactness possible, the gears and bearings located inside the power transfer unit need to be located in the most space efficient manner possible. This can result in conflicts in the sizing and shaping of various components of the unit.

For example, in a three axis power transfer unit, a conflict can exist between the sizing of a hypoid ring gear and clearance between that ring gear and the support shaft of an idler gear. As used herein, the term "three axis power transfer unit" is one in which a driving gear, an idler gear and a driven gear, all located on parallel axes, are utilized in the power transfer unit. Because of the size of the ring gear typically required in power transfer units and because of the size of the bearings required to support the shaft upon which the idler gear is mounted, the ring gear and the idler gear bearing support are too large and located too longitudinally close together to enable these components to be mounted in a common plane. This results in these components being staggered laterally, forcing the power transfer unit to be wider than it might otherwise be. Even then, the size of the ring gear encroaches on the idler gear support shaft thereby limiting the size of that shaft. Clearly, merely reducing the cross-sectional diameter of the idler gear support shaft would result in reduced strength in the shaft and thereby limiting the size and capacity of the shaft, as well as the supporting bearing.

As seen from the above, there exists a need for increasing the lateral compactness of a power transfer unit so as to minimize its occupation of space in the engine bay and beneath the body of the vehicle and additionally to provide for a power transfer unit which exhibits multiplatform characteristics.

It is also and object of this invention to provide novel constructions for supporting an idler gear in situations where the ring gear positioning would be in conflict with the idler gear support, without increasing the lateral compactness of the power transfer unit.

SUMMARY

In satisfying the above need, as well as overcoming the enumerated drawbacks and other limitations of the related art, the present invention provides a power transfer unit in which the conflict between the ring gear and the idler gear support are resolved so as to enable a more laterally compact unit.

The output of the transmission assembly is coupled to an input member and to a first gear wheel, the driving gear, in a parallel gear set. The driving gear transfers rotation through an idler gear to a driven gear. That driven gear is mounted on a shaft whose rotational axis is generally parallel to the rotational axis about which the driving gear rotates. On the end of this transfer shaft is mounted a first bevel gear or gear ring of the non-parallel gear set. The first bevel gear engages a second bevel gear, such as a hypoid pinion gear, mounted to or formed with a shaft; this shaft being oriented generally perpendicularly to the rotational axis of the ring gear. The opposing end of the shaft is the output of the power transfer unit.

The idler gear is rotatably supported on a non-rotating support members that extends through the idler gear. In one embodiment, the non-rotating support member is a boss extending from one side of the housing toward an opposing side of the housing. In another embodiment, the non-rotating support member is a stationary shaft.

By providing the support for the idler gear through a non-rotating support member, bearing supports for that support member are eliminated. By eliminating these bearing supports, additional area within the power transfer unit is freed up so as to accommodate the ring gear of the non-parallel gear set in a more laterally compact construction. In other words, the ring gear of the non-parallel gear set need not be laterally staggered or spaced so as to avoid conflict with the bearing support for the idler gear.

Further objects, features and advantages of this invention will become readily apparent to persons skilled in the art after review of the following description, with reference to the drawings and the claims that are appended to and form a part of this specification.

DETAILED DESCRIPTION

Figure 1:
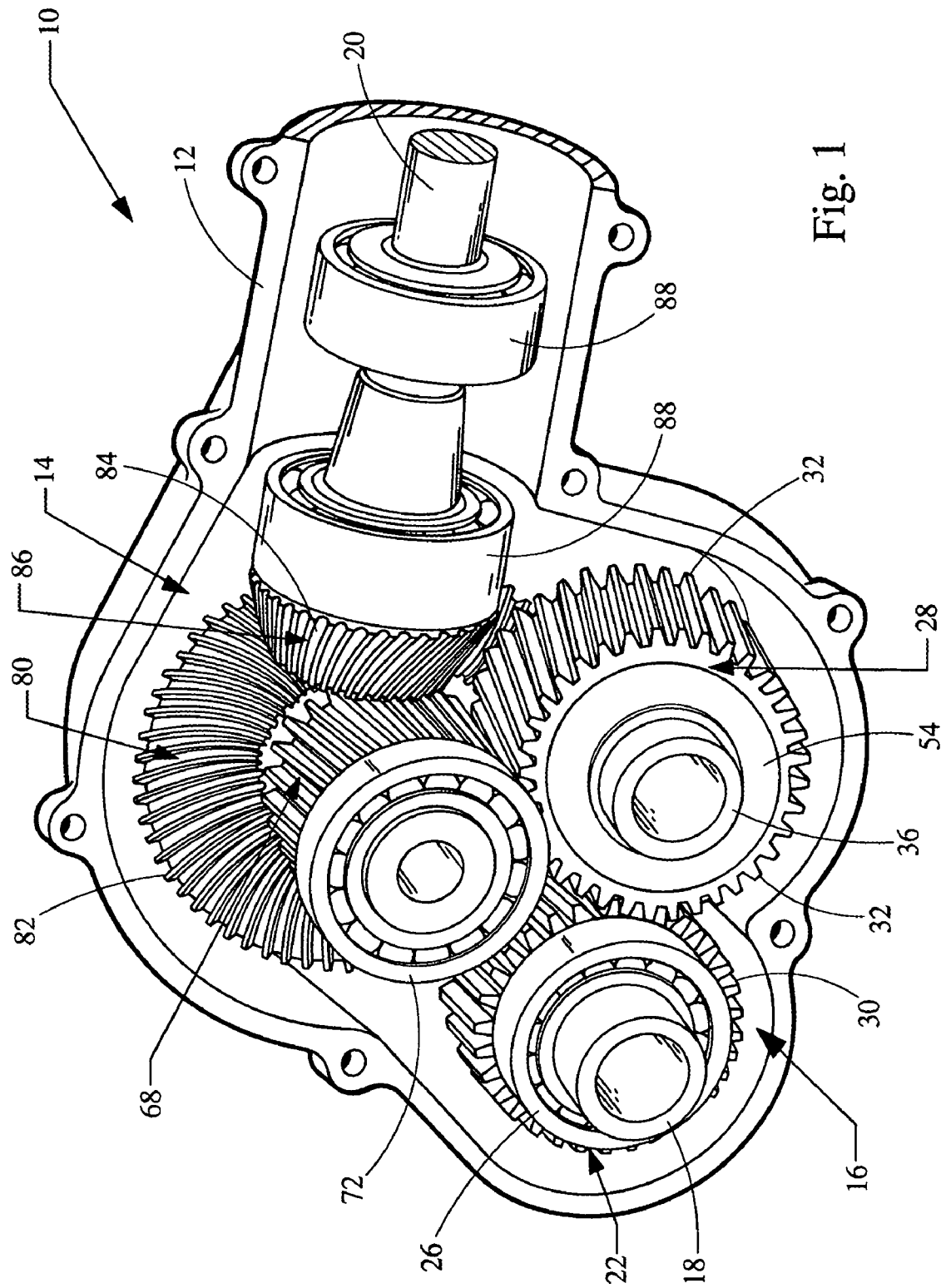
FIG. 1 is perspective view, with portions cut away, of a power transfer unit embodying the principles of the present invention.

Referring now to the drawings, FIG. 1 illustrates a power transfer unit 10 incorporating the principles of the present invention. The power transfer unit 10 includes a housing 12 in which the primary components of the unit 10 are integrally packaged. These components principally include a non-parallel gear set 14 and a parallel gear set 16.

As used herein, the term "parallel gear set" is intended to refer to mechanisms with gear wheels that transfer power from a first shaft to a second shaft; the first and second shafts defining axes that are generally parallel to one another.

The term "non-parallel gear set", as used herein, is intended to refer to any mechanism, (including, without limitation, mechanisms with gear wheels, mechanisms without gear wheels, gear trains, chain gears and belt systems) for transferring power from a first shaft to a second shaft; wherein the first and second shafts define axes that are generally not parallel to one another.

As mentioned above, the primary components of the power transfer unit 10 are all integrally packaged together and provided within a common housing 12. Input and outputs 18, 20 of the unit 1 0may or may not protrude from the housing 12 depending on the specific design criteria and the application in which the power transfer unit 10 is being employed.

Rotation from an output of a transmission assembly (not shown) is coupled to the input 18 (hereafter "driving shaft 18") of the power transfer unit 10, and in particular, of the parallel gear set 16. To facilitate engagement of the driving shaft 18 with the output of the transmission assembly, the end of the driving shaft 18 may be internally or externally splined as seen at 19.

The first gear wheel, driving gear 22, of the parallel gear set 16 is mounted to the driving shaft 18 by conventional means, such as unitarily forming the driving gear 22 with the driving shaft 18 (as illustrated) or welding the driving gear 22 to the driving shaft 18, so as to rotate with rotation of the driving shaft 18. This rotation thus occurs about an axis 24 defined by the driving shaft 18. To facilitate rotation of the driving shaft 18 and the driving gear 22, the driving shaft 18 is supported on bearings 26, one such kind being tapered bearings, supported by the housing 12.

Rotation from the driving gear 22 is transferred to an intermediate gear wheel, hereafter idler gear 28, by means of external teeth 30 on the driving gear 22 which intermesh with external teeth 32 on the idler gear 28. Preferably, the driving gear 22 and the idler gear 28 are helical gears so as to increase the torque transferring efficiency of the power transfer unit 10. Alternatively, however, the teeth 30, 32 could be formed straight. As the specific design criteria will dictate, the idler gear 28 may be larger, smaller or the same diameter as the driving gear 22.

Figure 2:
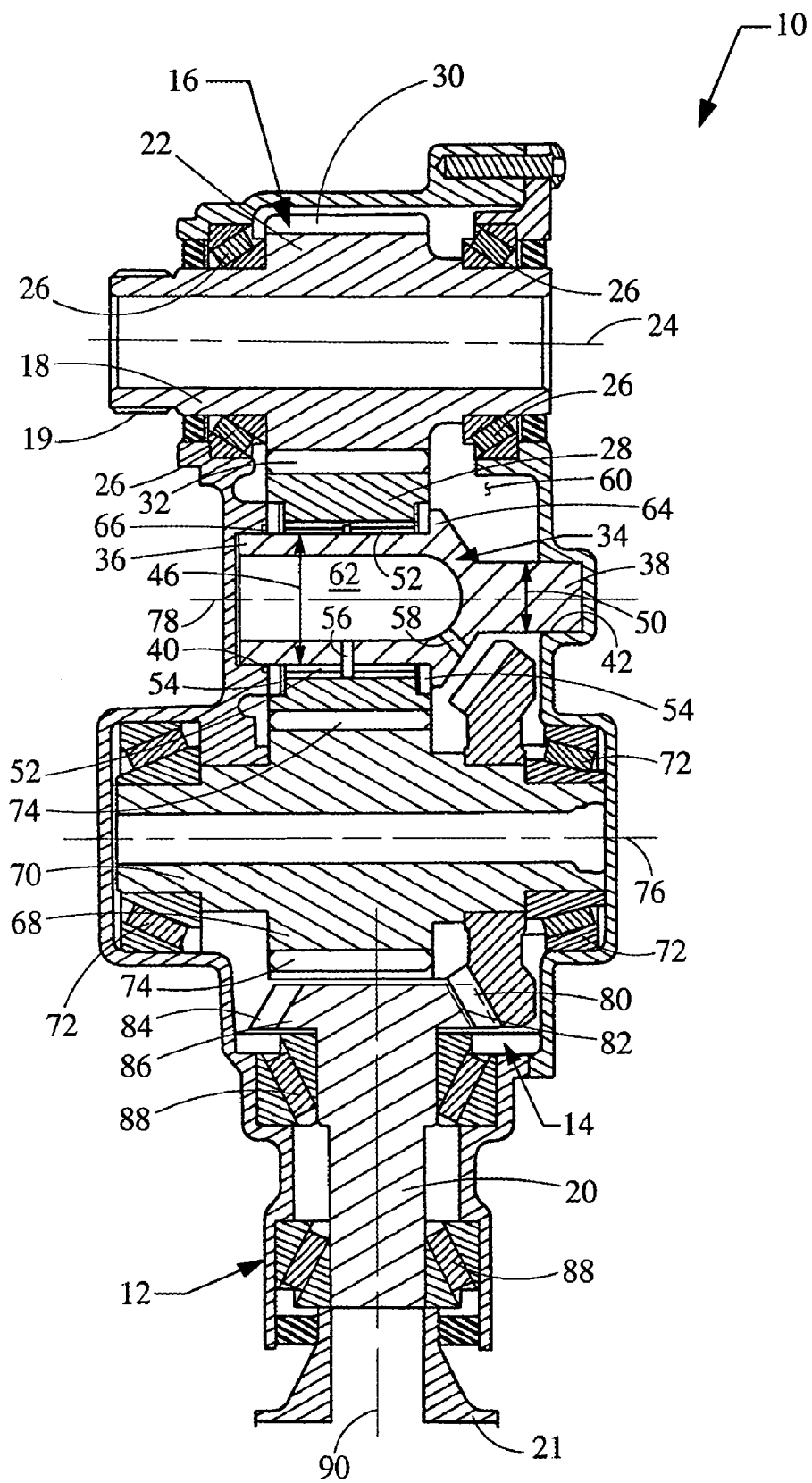
FIG. 2 is a layout view of a power transfer unit according to a first embodiment of this invention.

As seen in FIG. 2 in the first embodiment the idler gear 28 is rotatably supported on a stationary member extending through the idler gear 28. As illustrated in the embodiment of FIG. 2, the stationary member 34 is a stationary shaft "shaft 34"). The shaft 34 includes first and second ends 36, 38 that are respectively received within first and second seats 40, 42 defined in the housing 12. To prevent rotation of the shaft 34 relative to the housing 12, one or both of the first and second ends 36, 38 may be fixed by welding, keying, press-fitting or otherwise fixedly engaging the ends 36, 38 with the housing 12 at the seats 40, 42.

To enable enhanced lateral compactness of the power transfer unit 10, and as further described below, the shaft 34 is provided with a part 44 defining a first diameter 46 and, a second part 48 defining a second diameter 50, the second diameter 48 being less than the first diameter 46. The idler gear 28 is rotatably supported on the first part 44 by radial bearings 52. Axially, the idler gear 28 is supported by axial support members 54. Since the axial loads applied to the idler gear 28 tend to be modest, the axial members 54 may be needle thrust bearings or simple thrust washers. The radial loads handled by the radial bearings 52 can be large and, accordingly, the radial bearings 52 must be relatively wide. In this instance, a pair of radial needle bearings are used. Through the use of needle bearings as the radial bearings 52, their narrow radial dimension allows for the larger first diameter 46 of the first part 44. Utilization of radially thicker tapered roller bearings would require the diameter of the first part 44 to be decreased resulting in a decrease in the strength of the stationary shaft 34. However, if a lower strength shaft was acceptable for a given design, tapered roller bearings could be utilized or, if reduced diameter tapered roller bearings were designed, they could be used.

In order to provide lubrication to the radial needle bearings 52, the stationary shaft 34 is provided with one or more lubrication ports 56, 58. The lubrication port 56 is located such that it delivers lubrication to annular space between the pair of radial needle bearings 52. Accordingly, the lubrication port 56 includes a discharge opening on the exterior surface of the first part 44 of the stationary shaft 34. To provide lubricant to the lubrication port 56, another lubrication port 58 extends to the exterior surface of the shaft 34 at a location to entrain lubricant from the sump 60 of the power transfer unit 10. As seen in the figure, the inlet opening of the lubrication port 58 is located in the region transitioning from the first part 44 to the second part 48. To further facilitate the transfer of lubricant, the first part 44 of the stationary shaft 34 is provided with a hollow interior generally designated at 62. Accordingly, both lubrication ports 56, 58 extend from the exterior surface of the shaft 34 to the hollow interior 62. As will be readily appreciated, other locations for the ports may be employed.

In order to locate and retain the idler gear 28 on the first part 44 of the stationary shaft 34, a shoulder 64 is formed on the stationary shaft 34 in the region transitioning from the first part 44 to the second part 48 and axial members 54 engage the shoulder 64. Axial movement of the idler gear 28 in the opposing direction is limited by appropriate portions of the housing 12. Initial retention of the idler gear 28 on the stationary shaft 34 may be achieved by a snap ring 66 received within an appropriately located groove in the first part 44 of the stationary shaft 34.

From the idler gear 28, rotation is transferred to a third gear, driven gear 68, of the parallel gear set 16. The driven gear 68 is supported by a driven shaft 70 which is in turn rotatably supported on bearings 72 within the housing 12. The driven gear 68 may be fixed to the driven shaft 70 in a conventional manner, including unitarily forming the driven gear 68 with the driven shaft 70 (as illustrated) or welding the driven gear 68 thereto. To facilitate the transfer of rotation from the idler gear 28 to the driven gear 68, external teeth 74 on the driven gear 68 engage the teeth 32 of the idler gear 28.

Provided in the above described manner, the driven shaft 70 defines the third axis 76 of the parallel gear set; the second axis 78 being defined by the stationary shaft 34 and about which the idler gear 28 rotates. The power transfer unit 10 is therefore known as a three axis unit.

In order to transfer rotation from the parallel gear set 16 to the non-parallel gear set 14, a first bevel gear, ring gear 80, of the non-parallel gear set 14 is mounted to the driven shaft 70. Often, the location and diameter of the ring gear 80 is such that the ring gear 80 would typically encroach upon the support shaft of an idler gear. For this reason, ring gears have conventionally been laterally spaced on the driven shaft so as to be staggered from the idler gear support. This in turn forces the power transfer unit to be wider than if the encroachment did not occur. With the present invention, the encroachment is accommodated so as to allow for reduced lateral compactness in the power transfer unit. Specifically, the location of the ring gear 80 on the driven shaft 70 is such that the ring gear 80 extends to an area adjacent to that part of the stationary shaft 34 having a smaller diameter 50, the second part 48. Since the stationary shaft 34 does not require support bearings, additional area is freed up to accommodate and accept the ring gear 80 without requiring staggering or axial spacing thereof along the driven shaft 70. This results in the lateral compactness of the power transfer unit 10 being reduced.

The ring gear 80 is provided with teeth 82 which engage teeth 84 of a second bevel gear 86. The second bevel gear 86 is supported by one end of the output shaft 20. The second bevel gear may be supported by the output shaft 20 by conventional means including unitarily forming the bevel gear 86 with the output shaft 20 (as illustrated) or welding the bevel gear 86 to the output shaft 20. The output shaft 20 is supported within the housing 12 by bearings 88 enabling rotation of the shaft 20 about axis 90. As seen in FIG. 2, this second axis 90 of the non-parallel gear set 14 is generally oriented perpendicular to the axes 24, 76, 78 of the parallel gear set 16 and extends generally longitudinally with respect to the vehicle.

While not readily apparent in FIG. 2, the axes 76 and 90, about which the ring gear 80 and the second bevel gear 86 respectively rotate, may be such that the axes 76 and 90 intersect one another or do not intersect one another. In the later situation, which is preferred, the non-parallel gear set 16 is a hypoid bevel gear set.

Figure 3:
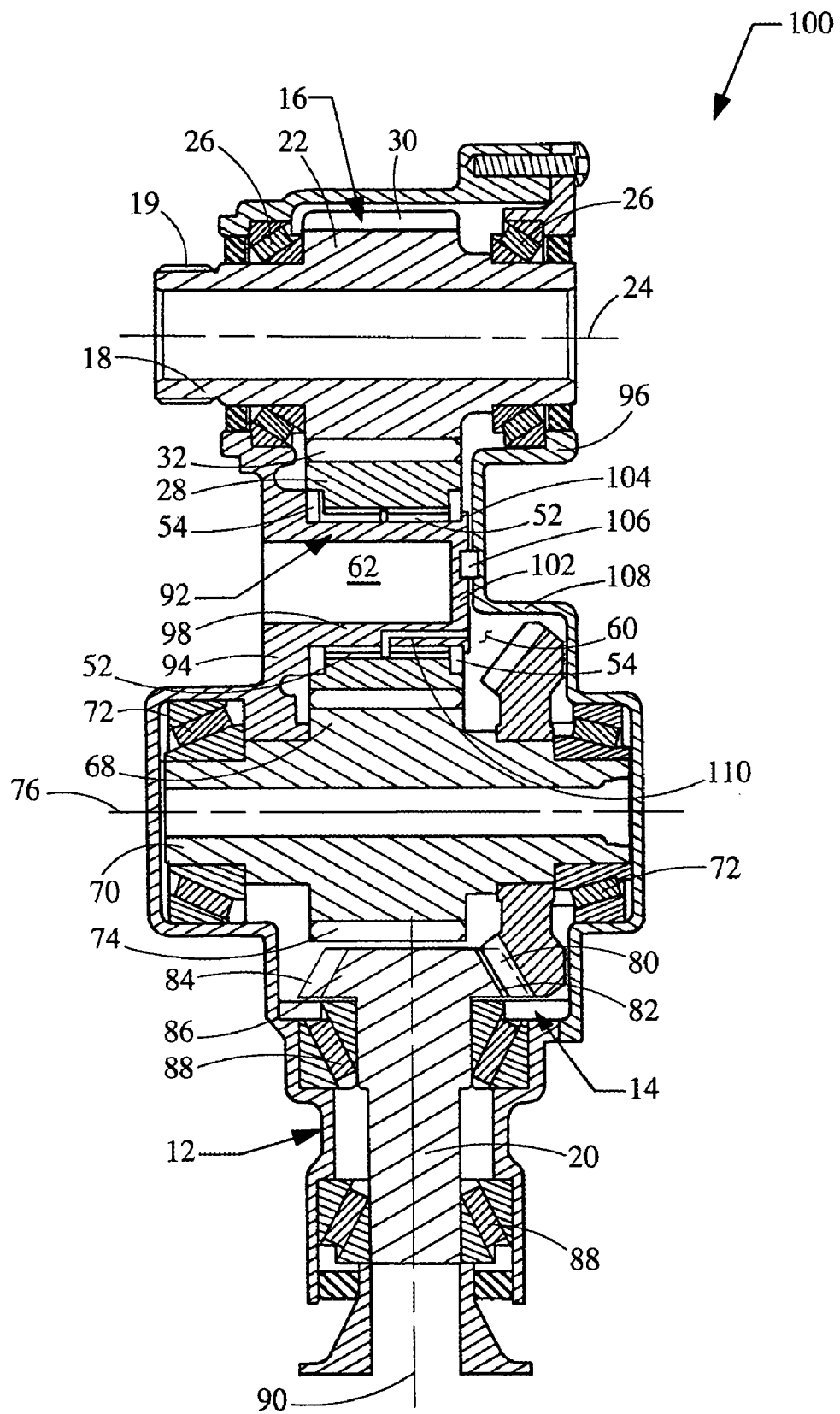
FIG. 3 is a layout view of a power transfer unit according to a second embodiment of the present invention.

Referring now to FIG. 3, a second embodiment of a power transfer unit incorporating the principles of the present invention is generally illustrated therein and designated at 100. Since the power transfer unit 100 incorporates many of the components and features illustrated and described in connection with FIG. 2, common elements have been given like reference numerals. The difference between the first and second embodiments lies within the manner in which the idler gear 28 is supported in the power transfer unit. Accordingly, it is not believed that a detailed discussion regarding all of the common components of the power transfer unit from the prior embodiment is required in connection with the second embodiment. The reader's attention is therefore directed to the preceding of the detailed description in that regard. The discussion which follows will be limited to the manner in which the idler gear 28 is supported in this second embodiment.

Similar to the first embodiment, the idler gear 28 of the second embodiment is rotatably supported on a stationary member 92 extending through the idler gear 28. In the second embodiment, however, the stationary member 92 is a boss ("boss 92"). The boss 92 is unitarily formed with the housing 12 and extends from a first side 94 of the housing toward a second side 96 of the housing 12. The boss 92 is thus formed as an extension off of the first wall 94 and includes a cylindrical wall 98 terminating at a closed end 102. The exterior surface of the cylindrical wall 98 defines the bearing seat for the radial needle bearings 52. Axially, the idler gear 28 is supported by axial support members 54, which, again, may be needle thrust bearings or simple trust washers. In order to locate and retain the idler gear on the boss 92, a shoulder 104 is formed about the outer periphery of the end wall 102. While the boss 92 should be sufficiently stable and rigid on its own, the boss 92 may be further stabilized and located relative the second side 96 through the providing of an interlock 106 extending between the second side 96 of the housing and the end wall 102 of the boss 92. While the interlock 96 may take many forms, it may include, but is not limited to, means such as dowels and pins.

To further facilitate the lateral compactness of the power transfer unit 100, the end wall of the boss 92 preferably terminate adjacent to the corresponding lateral end of the idler gear 28. The second side 96 of the housing is therefore formed with a recess 108 extending toward the interior of the power transfer unit 100 so as to be immediately adjacent to the end wall 102. The recess 108 is formed and located such that the ring gear 80 extends to a location adjacent thereto and which is laterally adjacent to at least a portion of the boss 92.

In order to provide lubrication to the radial needle bearings 52, the boss 92 is provided with at least one lubrication port 110. The lubrication port 110 includes a discharge opening in a radially exterior surface of the cylindrical wall 98, which is located such that it delivers lubrication to the annular space between the pair of radial needle bearings 52. The inlet opening of the lubrication port 110 is provided so as to extend through the end wall 102 of the boss 92 into the sump 60 of the power transfer unit. In this way lubricant can be entrained from the sump 60 to the radial needle bearings 52.

As a person skilled in the art will readily appreciate, the above description is meant as an illustration of an implementation of the principles of this invention. This description is not intended to limit the scope or application of this invention in that the invention is susceptible to modification, variation and change, without departing from the spirit of this invention, as defined in the following claims.

We claim:

1. A motor vehicle power transfer unit for distributing torque from a transmission assembly between a front wheel drive line and a rear wheel drive line, said power transfer unit comprising:

a housing substantially enclosing said power transfer unit;

an input portion adapted to connect to an output of the transmission assembly;

an output portion adapted to connect to an input of the rear wheel drive line; and a parallel gear set and a non-parallel gear set coupled between said input portion and said output portion; wherein:

the parallel gear set includes:
  a driving gear,
  an idler gear engaged with the driving gear;
a non-rotating support member extending through the idler gear, supporting the idler gear in rotation thereon, secured to the housing, and including a first part having a first diameter, a second part having a second diameter smaller than the first diameter, a transition surface between the first part and the second part, and a space that is at least partially bounded by the transition surface and the second diameter, and
  a driven gear engaged with the idler gear, the non-parallel gear set including:
    a ring gear secured to the driven gear, formed with beveled gear teeth facing the driven gear, and extending toward the second part and into said space, and
    an output gear engaged with the ring gear.

2. The power transfer unit of claim 1 wherein said support member is a portion of said housing.

3. The power transfer unit of claim 2 wherein said portion of said housing is a boss extending from one side of said housing.

4. The power transfer unit of claim 2 wherein said boss includes a cylindrical wall closed at one end by an end wall.

5. The power transfer unit of claim 4 wherein said boss is supported by an opposing side of said housing.

6. The power transfer unit of claim 4 wherein said end wall includes a shoulder extending from a periphery thereof, said shoulder limiting axial movement of said idler gear.

7. The power transfer unit of claim 4 wherein said boss is hollow and includes portions defining a lubrication port in said cylindrical wall in an area supporting said idler gear.

8. The power transfer unit of claim 1 wherein said support member is a shaft supported by said housing.

9. The power transfer unit of claim 1 wherein said idler gear is mounted to said first part.

10. The power transfer unit of claim 1 wherein said first part engages one side of said housing and said second part engages an opposing side of said housing.

11. The power transfer unit of claim 1 wherein said first part of said support member includes a hollow portion.

12. The power transfer unit of claim 1 wherein said first part includes at least one lubrication port therein.

13. The power transfer unit of claim 12 wherein portions of said first part define a discharge opening of said lubrication port.

14. The power transfer unit of claim 12 wherein portions on an exterior surface of said support member define an intake opening of said lubrication port.

15. The power transfer unit of claim 12 wherein said lubrication port extends from an exterior surface of said support member to a hollow portion within said support member.

16. The power transfer unit of claim 15 wherein said hollow portion is within said first part.

17. The power transfer unit of claim 1 wherein said support member includes a shoulder located between said first and second parts, said shoulder limiting axial movement of said idler gear.

18. The power transfer unit of claim 1 wherein said idler gear is supported on said support member by needle bearings.

19. The power transfer unit of claim 18 wherein said needle bearings include radial needle bearings.

20. The power transfer unit of claim 18 wherein said needle bearings include needle thrust bearings.

21. The power transfer unit of claim 1 wherein the transition surface is tapered.

22. The power transfer unit of claim 1 wherein said non-parallel gear set is a bevel gear set.

23. The power transfer unit of claim 22 wherein said bevel gear set is a hypoid bevel gear set.

24. A motor vehicle power transfer unit for distributing torque from a transmission assembly between a front wheel drive line and a rear wheel drive line, said power transfer unit comprising:

a housing substantially enclosing said power transfer unit;
an input portion adapted to connect to an output of the transmission assembly;
an output portion adapted to connect to an input of the rear wheel drive line;
a parallel gear set and a non-parallel gear set coupled between said input portion and said output portion; and
said parallel gear set including a driving gear, an idler gear engaged with the driving gear, a driven gear engaged with the idler gear, a non-rotating support member extending through the idler gear and supporting the idler gear in rotation thereon, the support member being secured to and supported on the housing and including a first part having a first diameter, a second part having a second diameter second part, and a space that is at least partially bounded by the transition surface and the second diameter, and
said non-parallel gear set including a ring gear and a pinion gear, said ring gear and said driven gear being supported by a transfer shaft for rotation therewith, said ring gear being secured to said transfer shaft, located adjacent said driven gear, formed with bevel gear teeth tat face the driven gear and are engaged with teeth on the pinion gear, and having a diameter wherein said ring gear extends toward the second part and into said space.

25. The power transfer unit of claim 24 wherein the non-rotating member is a boss extending from one side of said housing toward an opposing side of said housing.

26. The power transfer unit of claim 24 wherein the idler gear is supported on said non-rotating member by needle bearings.

27. The power transfer unit of claim 24, said support member being supported within said housing without utilizing bearings.

28. The power transfer unit of claim 24 wherein:
the ring gear rotates within a radial space located radially outboard of the second diameter.

* * * * *